Feb. 19, 1963

R. E. RAYMOND 3,077,898

FLUID RELIEF VALVE

Filed Jan. 28, 1959

Fig. 1

Fig. 2

INVENTOR.
ROBERT E. RAYMOND
BY *Hofgren, Brady,*
*Wegner, Allen & Stellman*
ATTYS.

United States Patent Office 3,077,898
Patented Feb. 19, 1963

3,077,898
FLUID RELIEF VALVE
Robert E. Raymond, Zanesville, Ohio, assignor to Racine Hydraulics and Machinery, Inc., a corporation of Wisconsin
Filed Jan. 28, 1959, Ser. No. 789,606
2 Claims. (Cl. 137—491)

This invention relates to a fluid valve, and more particularly to a liquid relief valve for high pressure applications having superior stability to maintain system pressure, repetitive accuracy, and non-shock characteristics.

The object of this invention is to provide a new and improved fluid relief valve having superior sensitivity, stability, repetitive accuracy and non-shock characteristics and which will function to closely maintain the desired pressure and obtain even better control accuracy at the higher pressures.

Another object of this invention is to provide a high pressure fluid relief valve having a valve body with flow passage means in said body including a fluid inlet passage and a fluid outlet passage, a valve member having a first position for blocking fluid communication between said inlet and outlet passages, a piston member associated with the valve member, a piston chamber in which said piston is movably mounted, said piston chamber being of a size to hold sufficient fluid whereby fluid contained therein functions as a fluid spring on said piston member to urge the valve member toward blocking position, and means including a flow restriction connecting the inlet passage and the piston chamber.

Another object of the invention is to provide a fluid relief valve as defined in the preceding paragraph in which an accumulator is in communication with the piston chamber to aid in absorbing fluid pressure impulses by receiving a volume of fluid.

A further object of the invention is to provide a fluid relief valve in which a pilot valve is connected to the piston chamber to discharge fluid therefrom through a flow restrictor which rejects pressure pulsations.

Further objects and advantages will become apparent from the following detailed description taken in connection with the accompanying drawing in which:

FIG. 1 is a fragmentary vertical section taken through the center of a preferred embodiment of the relief valve; and FIG. 2 is a fragmentary vertical section taken through the center of another embodiment of the relief valve embodying the structure of FIG. 1 and an accumulator.

While this invention is susceptible of embodiments in many different forms, there is shown in the drawing and will herein be described in detail a preferred embodiment of the invention together with a modification with the understanding that the present disclosure is to be considered as an exemplification of the principles of the invention and is not intended to limit the invention to the embodiments illustrated. The scope of the invention will be pointed out in the appended claims.

As shown in the drawing, the relief valve comprises a main valve section indicated generally at 10 and a pilot valve section indicated generally at 11. The main valve section 10 has a main valve indicated generally at 12 for controlling the flow of fluid through the relief valve. A pilot valve member, indicated generally at 13, is openable to permit the main valve member 12 to freely move from its valve seat. The setting of the pressure whereby the pilot valve member 13 will open may be manually obtained by the setting mechanism indicated generally at 14, or may be remotely obtained in a manner more fully described hereinafter.

The main valve section 10 is composed of interfitted body parts 15, 16 and 17 held together by cap screws 17a extending through parts 16 and 17, and is provided on the interior thereof with a valve chamber 18 and an adjoining in-line piston chamber 19 having a cross sectional area greater than that of the valve chamber 18. The main valve section of the body has flow passage means including an inlet passage formed from channels 20 and 21 which connect the valve chamber 18 with a valve inlet 22. The flow passage means also includes an outlet passage comprising channels 23, 24 and 25 which connect the valve chamber 18 with a valve outlet 26. The relief valve, in use, is connected to a fluid line in which the fluid pressure is to be controlled by a connection to the valve inlet 22 and the valve outlet 26 is connected to tank by a suitable line (not shown).

An annular member 27 is fitted in the body of the main valve section 10 at the entrance to the outlet passage channel 23 to form a valve seat closeable by the main valve member 12 to block fluid communication between the inlet and outlet passages. The channels 21 and 24 have their external ends plugged by caps 28 and 29, respectively, to block any fluid flow therefrom.

The main valve member 12 comprises a cylindrical stem 30 terminating in a conical end 31 engageable with the valve seat 27. The valve stem 30 has a piston 32 formed integrally therewith of a cross sectional area substantially greater than that of the valve stem 30. The piston 32 is slidable in the piston chamber 19 and has a first face 33 facing toward the valve chamber 18 whereby the face is subjected to the pressure of fluid in the valve chamber and the inlet passage. An opposite face 34 of the piston 32 has an annular skirt 35 formed about the periphery thereof and extending for a major part of the length of the piston chamber 19.

The piston chamber is of a size to hold sufficient fluid whereby the fluid functions as a fluid spring on the piston 32. A fluid such as oil used in machinery operation has a compressibility of 0.4% per 1,000 p.s.i. change in pressure. The size of the piston chamber is chosen to hold fluid sufficient to provide the necessary capacitance to constitute the fluid spring whereby high frequency movement of the valve member relative to its seat in the order of 300 to 400 cycles/second is permitted and will result in fast action of the valve member to maintain the system pressure which may extend up to 10,000 p.s.i. The piston chamber size at one side of the piston 32 is generally of a magnitude from 8 to 20 times the volume required for maximum piston member and valve member displacement. The dynamic movement of the valve member 12 is determined by the fluid flow rate and pressure through the valve. With a very low flow rate and a very high pressure the valve member movement is much less than the maximum, and thus said piston chamber size is of an even greater magnitude relative to this lesser movement. This provides a high capacity to provide fast action of the valve member.

The piston chamber 19 is in fluid communication with the inlet passage and the valve chamber 18 through a flow-restricting orifice passage 36 formed in the valve stem 30 and extending from the surface thereof to an internal passage 37 extending lengthwise of the valve stem 30. The internal passage 37 extends through the piston 32 and opens into the piston chamber. The main valve member 12 and piston 32, as well as the annular skirt 35 carried thereby, are proportioned to result in an unbalanced valve structure whereby the valve member is unbalanced towards a closed position on the valve seat 27. With the valve member closed as shown in FIG. 1, there is a greater area of piston face 34 and the end of annular skirt 35 subjected to fluid pressure tending to maintain the valve member closed on the valve seat 27 than the area of piston face 33 and the valve stem end 31 subjected to fluid pressure urging the valve member to an open position. As the pressure of the fluid in the inlet passage gradually increases, the valve member is more securely seated, thereby assuring a tight system.

The flow restricting orifice passage 36 functions as a resistance to flow and, in combination with the capacitance of the fluid in the piston chamber 19, enables the relief valve to sense the rate of change of fluid pressure and open the valve member when the rate of change exceeds a predetermined value. This results in limiting the overshoot of the valve beyond its setting when the pressure rises extremely rapidly. The orifice passage 36 also restricts reverse flow from the piston chamber 19. Stored energy in chamber 19 due to the high capacity acts to push piston and valve member 12 toward seat if pressure falls rapidly. This action makes valve respond fast to flow variations and the resulting pressure drops to maintain the stability of the valve.

The piston 32 and annular skirt 35 have an annular flange 37a and 37b, respectively, to closely engage the wall of the piston chamber 19 and seal off the ends of the chamber from each other.

A very light compression spring 38 is positioned in the piston chamber 19 between an adapter 39 fitted on the piston 32 and an adapter 40 seated in the valve body member 15. This spring 38 provides a small predetermined force to urge the valve member toward its closed position.

The main valve member 12 may also be opened under the control of the pilot valve section 11, and this section is responsive to a predetermined pressure in the piston chamber to open the piston chamber 19 to drain whereby fluid pressure acting on the valve stem end 31 and piston face 33 causes the main valve member to move away from the seat 27 to either open or further open the path between the fluid inlet and outlet passages.

The pilot valve 11 has a casing 50 engageable against the main valve body part 15, and is provided with an internal bore 51. The pilot valve body 50 has a passage 52 plugged by a cap 53 and a passage 54 connecting with a pair of passages 55 and 56 in the main valve body parts 15 and 17 which connect to the relief valve outlet passage whereby fluid flowing through the pilot valve is directed to tank.

A casing insert 57 is positioned within the pilot valve bore 51 and is secured in a passage 58 formed in the main valve body part 15. A passage 59 in the compression spring adapter 40 places the piston chamber 19 in fluid communication with the passage 58.

The casing insert 57 is formed with a flow passage 60 for entry of fluid into the pilot valve from the main valve and has a circular valve seat formed by an end of the flow passage with which the spherical valve member 13 is engageable to close the flow passage 60. The pilot valve member 13 is movably mounted within a bore 61 in the insert 57 for movement away from the valve seat. A movable guide member 62 for holding the pilot valve member on the seat is located within the valve body bore 51 and has its lower end extended within the insert bore 61 and formed with a partially spherical concave surface at its lower end to engage the upper side of the ball valve member 13. The guide member 62 has a flange 63 intermediate its ends whereby a spring 64 may have one end abutting against the flange and receiving the upper end of the guide member 62 while the opposite end of the spring 64 abuts against the surface of a cup-shaped ram 65 slidably disposed within the pilot valve body bore 51.

The force exerted on the ball valve member 13 by the spring 64 is manually adjustable by the setting mechanism 14 which comprises an adjusting screw 66 threaded in an end of the pilot valve body 50 and carrying a bearing 67 engageable with an end of the ram 65. Rotation of the adjusting screw 66 shifts its position longitudinally of the pilot valve body to vary the position of the ram 65 in the valve body bore 51 and to thus vary the compression of the spring 64. The position of the adjusting screw 66 is maintained by a first nut 68 threaded on the screw 66 and a second nut 69 also attached to the screw 66 and shown in part in FIG. 1 of the drawing.

A sleeve 70 positioned within the pilot valve body bore 51 is of a length to determine the maximum pressure setting of the pilot valve by limiting the movement of the ram 65 in a direction to compress the spring 64. This maximum pressure may be varied by utilizing a sleeve of the desired length.

The pressure setting of the pilot valve may be remotely controlled by a fluid pressure system having a connection to the pilot valve body at the inlet 71 at an end of the bore 51 whereby fluid pressure is selectively exerted against the ram 65 to shift the ram 65 in the bore and vary the compression of the spring 64. With the use of a selectively operable pressure at the inlet 71, a first control pressure for the pilot valve may be determined and upon release of the pressure at the inlet 71 the ram may then move toward the end of the bore 51 to a position as determined by the manually adjustable screw 66 for a second control pressure setting.

The casing insert passage 60 has a flow restricting orifice 71a at its lower end to reject pressure pulsations in the fluid in the piston chamber 19 from reaching the pilot valve member 13 which permits the capacitance of the fluid in the piston chamber 19 to absorb them. A piston member 72 is slidably mounted in the flow passage 60 and has its upper end partially spherically concave to fully engage the underside of the ball valve member 13. The piston 72 has flow passages 72a at its upper end whereby fluid may flow when valve member 13 is open. The flow restricting orifice 71a and the piston member 72 contribute to smooth chatter-free operation of the pilot valve member 13 in that the orifice 71a creates a damping action on the pilot valve member. There is a cushioning of the pilot valve member 13 as it approaches its seat due to the restriction of reverse fluid flow through the orifice 71a. This action is facilitated by the piston 72 since as the pilot valve member 13 moves downwardly towards its seat, the piston 72 must also move downwardly, and this requires the piston to squeeze fluid through the orifice 71a. As shown in the drawing, the piston 72 is in its lower position, and when the flow commences through the pilot valve 11 the viscous drag of the fluid will move the piston 72 into engagement with the pilot valve member 13.

The valve body part 15 has a port 85 in the wall thereof forming a passage from the valve exterior to the piston chamber and is shown capped by a cap 86.

In operation, assume the main valve member 12 is positioned to block communication between the inlet and outlet passages of the valve. When the pressure of the fluid in the inlet passage exceeds a predetermined amount, this pressure which also exists in the piston chamber 19 acts to lift the pilot valve member 13 off its seat to connect the piston chamber 19 to drain. This connection is made through the passages 54, 55 and 56 previously referred to, as well as the passages 75 and 76 in the casing insert 57, and passages 77 and 78 in the sleeve 70 disposed within the pilot valve body bore 51. This connection of the piston chamber 19 to drain through the pilot valve member results in the pressure of fluid in the valve chamber 18 raising the valve member away from the valve seat 27 to connect the inlet and outlet passages of the relief valve. When the pressure of fluid in the accumulator becomes less than that required to maintain the pilot valve member 13 open, the pilot valve member closes and the main valve member 12 is returned onto its seat.

When the rate of fluid pressure change exceeds a predetermined amount, then the valve member moves in a direction away from the valve seat to either open or further open the connection between the inlet and outlet fluid passages as permitted by the capacitance of the fluid spring provided by the volume of fluid in piston chamber 19.

Although the relief valve disclosed herein is disclosed as a unitary mechanism, it is within the contemplation of my invention that the pilot valve 11 could be separate from the main valve section 10 with suitable line connections between the parts and that a fluid accumulator disposed externally of the main valve section 10 could be connected to the piston chamber 19 by suitable fluid lines.

In the embodiment disclosed in FIG. 2, the fluid relief valve additionally has a fluid accumulator associated therewith to assist the valve in absorbing pressure pulsations by enlarging the capacitance of the valve.

The fluid relief valve of FIG. 2 embodies the assembly disclosed in FIG. 1 with an accumulator, indicated generally at 90, connected to the port 85 by a line 91 whereby an accumulator inlet chamber 92 is in fluid communication with the piston chamber 19.

The accumulator 90 comprises a body 93 having an internal bore in which a sleeve 94 is positioned and held against a washer 95 by an apertured locking screw 96. The sleeve 94 defines a slidable housing for a spool 97 which is subjected to the pressure of fluid in the inlet chamber 92. The spool 97 is limited in one direction of movement by engagement with the washer 95, and may move in the other direction against a relatively light spring 98 extended between the spool 97 and a floating guide member 99. The guide member 99 is supported by a second spring 100 having greater strength than the spring 98 and which extends between the guide 99 and a second guide 101 located at an end of the body bore remote from the inlet chamber 92. An end cap 102 fits in the body bore and threadably adjustably mounts a stem 103 engageable with a slidable plug 104 which engages the spring guide 101 through a ball 105. By adjustment of the stem 103, the force on the springs 98 and 100 may be varied. Sufficient movement of the stem 103 will fully compress the spring 98 to effectively remove the spring from the system.

With the relatively low energy spring 98, the spool 97 may readily shift to accept small quantities of fluid at a relatively low pressure to provide a high capacity. When the spool 97 engages a ball 106 carried by the guide member 99 to then subject the spool 97 to the high energy spring 100, further movement of the spool 97 is caused by fluid pressures sufficiently high to overcome the force of the spring 100.

A nut 107 is threaded on the stem 103 for maintaining the stem in adjusted position.

A port 107a connects with the bore of the accumulator body whereby leakage fluid may drain to tank.

I claim:

1. A fluid relief valve comprising, a valve body having a valve chamber, a fluid inlet passage and a fluid outlet passage in communication with said chamber, a valve member in said chamber for blocking communication between the inlet passage and the outlet passage, a piston connected to said valve member with one face thereof subject to the pressure of fluid in said inlet passage, a chamber for said piston in restricted fluid communication with said inlet passage, said piston chamber being of a size to hold sufficient fluid whereby fluid contained therein functions as a fluid spring on said piston to urge the valve member toward a blocking position relative to said passages and yieldable upon an excessive rate of pressure change, a pilot valve for draining fluid from said piston chamber, a flow restriction between the piston chamber and the pilot valve to reject pressure pulsations in the fluid spring, and a fluid accumulator positioned externally of the valve body and connected to said piston chamber to aid in absorbing pressure pulses.

2. A fluid relief valve comprising, a valve body having a valve chamber and an adjacent piston chamber having a volume substantially greater than that required for piston displacement, flow passage means in said body including fluid inlet and outlet passages in communication with said valve chamber, a valve seat in said valve chamber at the entrance of said outlet passage, a valve member having a stem engageable with said seat to close said outlet passage, a piston member integral with said valve member and slidable in said piston chamber at one end thereof whereby a major part of the piston chamber may hold sufficient fluid to provide capacity sufficient to constitute a fluid spring in high frequency operation of the valve member against which the valve member may open, said piston member having one face facing said valve chamber and an opposite face with an area exposed to fluid pressure greater than said one face, an annular skirt extending from the opposite piston face, means placing said piston chamber at the skirt side of the piston in fluid communication with the inlet passage, a pilot valve in fluid communication with the piston chamber responsive to a predetermined pressure in the piston chamber to open the piston chamber to drain, a flow restricting orifice between the piston chamber and pilot valve to reject pressure pulsations whereby they may be absorbed by the fluid in said piston chamber, and a fluid accumulator connected to said piston chamber remote from said one end thereof to aid in absorbing pressure impulses by receiving a volume of fluid.

References Cited in the file of this patent

UNITED STATES PATENTS

| | | |
|---|---|---|
| 1,035,339 | Fox | Aug. 13, 1912 |
| 1,776,937 | Timbs | Sept. 30, 1930 |
| 1,846,483 | Gilbert | Feb. 23, 1932 |
| 2,498,542 | Gardiner | Feb. 21, 1950 |
| 2,521,264 | Stark | Sept. 5, 1950 |
| 2,578,795 | Gardiner et al. | Dec. 18, 1951 |
| 2,763,280 | Snyder | Sept. 18, 1956 |